United States Patent [19]

Sikora

[11] Patent Number: 5,094,600
[45] Date of Patent: Mar. 10, 1992

[54] APPARATUS FOR MEASURING ECCENTRICITIES OF A ROD OF PLASTIC MATERIAL

[75] Inventor: Harald Sikora, Bremen, Fed. Rep. of Germany

[73] Assignee: Sikora Industrieelektronik GmbH, Bremen, Fed. Rep. of Germany

[21] Appl. No.: 577,040

[22] Filed: Sep. 4, 1990

[30] Foreign Application Priority Data

Dec. 21, 1989 [DE] Fed. Rep. of Germany ....... 3942214

[51] Int. Cl.$^5$ .................. B29C 47/02; B29C 47/92
[52] U.S. Cl. ................... 425/113; 264/40.1; 264/40.2; 425/140; 425/141
[58] Field of Search .............. 425/113, 141, 140, 171, 425/172, 400; 264/40.1, 40.2

[56] References Cited

U.S. PATENT DOCUMENTS

| Re. 29,886 | 1/1979 | Dembiak et al. | 425/140 |
| 4,086,044 | 4/1978 | Sikora | 425/113 |
| 4,226,580 | 10/1980 | Lupke et al. | 425/113 |
| 4,248,824 | 2/1981 | Hattop | 425/113 |
| 4,303,734 | 12/1981 | Sullivan | 425/113 |
| 4,520,672 | 6/1985 | Saint-Amour | 264/40.1 |
| 4,605,525 | 8/1986 | Baxter | 425/140 |
| 4,668,173 | 5/1987 | Garner et al. | 425/113 |
| 4,708,837 | 11/1987 | Baxter et al. | 425/140 |
| 4,838,777 | 6/1989 | Weber | 425/113 |
| 4,940,504 | 7/1990 | Starnes, Jr. | 425/113 |

FOREIGN PATENT DOCUMENTS 0099993 6/1983 European Pat. Off. .
2826857 1/1980 Fed. Rep. of Germany .

Primary Examiner—Jay H. Woo
Assistant Examiner—W. J. Matney, Jr.
Attorney, Agent, or Firm—Brown, Martin, Haller & McClain

[57] ABSTRACT

An apparatus for measuring eccentricities of a rod of plastic material extruded from an extruder includes an optical sensor arrangement having a central axis, the arrangement including a pair of optical sensor devices circumferentially spaced at 90 degrees to one another about the central axis and a pair of light sources disposed on sides of the central axis opposite to the respective optical sensor devices for providing shadows of the rod on the optical sensor devices. A mounting fixture supports the sensor arrangement with its central axis aligned with the nozzle axis of the extruder so that the extruded rod will travel along the central axis of the sensor arrangement. An output device is connected to the sensor devices for measuring deviations of the shadows from predetermined positions indicating concentricity of the rod.

8 Claims, 2 Drawing Sheets

APPARATUS FOR MEASURING ECCENTRICITIES OF A ROD OF PLASTIC MATERIAL

BACKGROUND OF THE INVENTION

The present invention relates to an apparatus for measuring the eccentricity of a rod of plastic material, in particular of a plastic sleeve enclosing a conductor, which sleeve is extruded from an extruder onto the conductor and is vulcanized in a pressure tube connected to the extruder.

It has been common practice e.g. to enclose the conductor of a cable in a plastic sleeve by means of an extruder, with the cable thereafter being introduced into a tubular housing for interlacing or vulcanizing thereof. Such apparatusses have become known from German printed application 28 26 857 or European patent application 00 99 993.

The sleeve must be of a predetermined thickness in order to obtain e.g. desired insulation characteristics. Accordingly, it has become known to provide an optical inspection device on the tubular housing for measuring the diameter of the cable. This is achieved e.g. by means of a transverse tube carrying an inspection glass of a predetermined glass composition, which allows to measure the diameter of the rod in the housing e.g. by means of an optical measuring device. In the tubular housing there is provided a light source, preferably an infrared light source for producing a sufficient background brightness for enabling a relatively precise diameter inspection by means of diode lines or the like. Such an apparatus has also become known from the above mentioned European patent application 00 99 993. If the measured diameter is not of a desired value, the speed of the extruder screw or the rod withdrawal velocity is adjusted so as to obtain the desired value.

On the one hand the diameter should exceed a desired minimum diameter, on the other hand a too big diameter is not desirable to avoid excess material consumption. Furthermore eccentricities of the sleeves may exist, which eccentricities cannot be detected by diameter measurements. If the optical indicating device indicates a desired diameter value, this does not necessarily mean that the sleeve is concentric to the conductor. If the sleeve is of eccentric shape, the cable does not have the desired insulation characteristics because the sleeve is not of sufficient thickness in certain areas.

For the above reasons the knowledge of the position of the conductor within the sleeve at the extruding process is a further important information. If measurements are taken downstream of the vulcanizing path, a correction by corresponding adjustments of the extruder tools may be too late; a substantial cable length may then be of an unacceptable eccentric shape.

From U.S. Pat. No. 4,086,044 it has become known to detect an eccentricity by induction measuring means. Inductive sensors are used to sense the position of the conductor relative to the sensors, while optical means are used to determine the position of the cable sleeve. This allows to measure or compute the wall thickness of the sleeve. Eccentricity measurements by means of inductive sensors including coils within the vulcanizing pressure tube is not practical. In particular sophisticated temperatures compensating means would be necessary to obtain at least approximately precise values.

Similar problems are encountered at the production of plastic tubes, where it is intended to obtain a circumferentially uniform wall thickness and to avoid eccentricities.

SUMMARY OF THE INVENTION

It is a primary object of the present invention to provide an apparatus for measuring eccentricities of a rod of plastic material so as to readily enable adjustments of the extruder for elimination of such eccentricities.

The apparatus of the present invention provides a pair of optical sensor devices circumferentially spaced at 90° to one another and disposed in fixed relation to a guide for the rod. These sensor devices are arranged to sense the shadows produced by the sleeve as a result of the light from light sources disposed on opposite sides of the rod. This allows to determine not only the rod diameter but also the relative position of the shadow. The position of the shadow with respect to a desired position is an indication of the eccentricity or concentricity of the rod. In the case of tube production the guide is comprised of a rod-like core extending beyond the extruder nozzle. So also the inner diameter of the tube would be fixed. Accordingly the position of the shadow allows to determine any deviations thereof. In the case of sleeving a conductor the conductor is centrally guided by a guide in the nozzle head of the extruder. With respect to the conductor an apparatus is provided which aligns the extruder to the pressure tube precisely and in a reproduceable manner. Accordingly the position of the conductor at the measuring station may be considered to be known. Alternatively the exact position of the conductor at the measuring station could be determined by measuring a conductor without sleeve or having a thin sleeve. Such a thin sleeve would hardly cause an error in case there is an eccentricity. Furthermore there are several conditions ensuring that the sleeve in the pressure tube is in a predetermined position. Of relevance in this connection are, on the one hand, an alignment of the extruder to the pressure tube and, on the other hand, a centering guide for the conductor in the nozzle head and a guide for the sleeved conductor normally present in the pressure tube to ensure that the conductor extends along the tube center. Furthermore, so-called sagging measurements are performed in the pressure tube (sagging measurements are necessary only with inclined pressure tubes; of course they are unnecessary with vertical pressure tubes). By means of sagging measurements the vertical position of the conductor may be determined and controlled. If accordingly the position of the conductor at the inlet of the pressure tube is fixed due to the above circumstances, the position of the shadow caused by the light source and detected in the optical sensor device is an indication of any eccentricities of the sleeve.

The apparatus of the present invention is extremely simple in structure and assembly and is very rugged and resistant to adverse influences in operation. Only a pair of optical devices as known already from diameter inspection have to be mounted on the pressure tube. Additionally an apparatus for aligning the extruder to the pressure tube should be provided. Only minimal structural expenditure is required to this end.

A further advantage of the apparatus of the present invention is that it allows to measure any eccentricities relatively quickly, i.e. very close to the extruder; accordingly adjustments of the extruder tools for eliminating any eccentricities may be performed very quickly also. In one embodiment of the invention a block insertable along the pressure tube is provided, which block includes the light sources and carries a pair of inspection glass fixtures having axes offset with respect to each other for 90°. The pressure tube sections are sealingly fixed to opposite ends of such block, and the block includes openings for passing light therethrough, with the inspection glasses being provided in the area of these openings by means of suitable tube sections. The apparatus of the present invention may be readily mounted subsequently to an already assembled pressure tube.

The optical sensor devices which e.g. are cameras including diode lines may be connected to the block or the inspection glass fixtures by means of an arm. Accordingly the block is designed so as to allow for secure and precise mounting of the sensor devices.

In a further embodiment of the invention the light sources comprise elongated incandescent strips adapted to be provided on a support member including the electrical terminals. The support member and the incandescent strips may be formed as a unit to be inserted into a corresponding recess of the block. If the incandescent strips become defective after a substantial period of operation, they may be readily removed and replaced by fresh incandescent strips.

BRIEF DESCRIPTION OFT HE DRAWINGS

The invention will be explained in further detail with respect to the enclosed drawings.

FIG. 1 schematically shows an extruder and a vulcanizing pressure tube including an apparatus of the present invention.

FIG. 2 schematically shows a section of the apparatus in FIG. 1 along line 2—2, however in a rotated position.

DESCRIPTION OF THE PREFERRED EMBODIMENT

Figure 1:
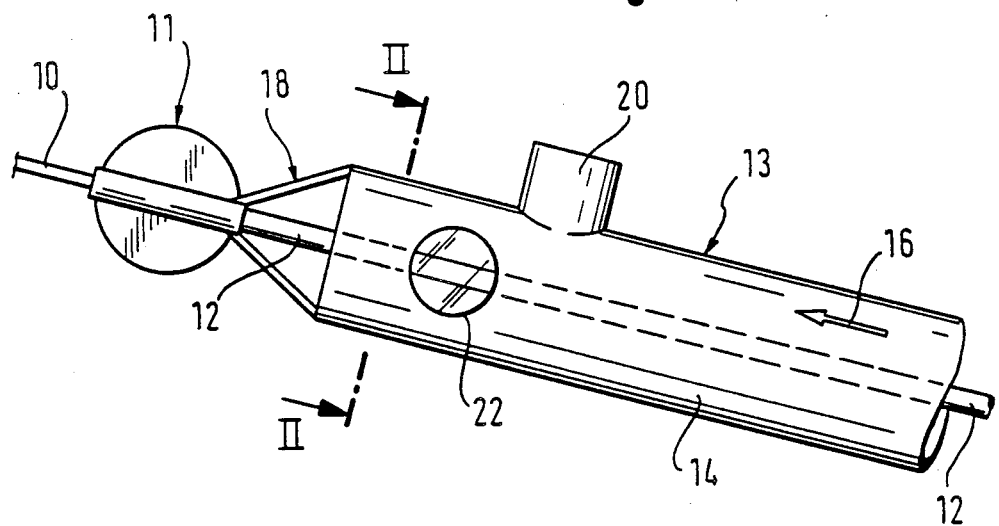

As shown in FIG. 1 an electrical conductor 10 is enclosed in a plastic sleeve to form a cable in an extruder 11. The thus formed rod 12 is introduced into a tubular housing 13 to be vulcanized in a manner known per se. A protective gas as nitrogen or water vapour is supplied via a suitable connector (not shown) and flows in the direction of arrow 16. Extruder 11 is coupled to tubular housing 13 by means of a mechanism 18 adapted to precisely align tubular housing 13 and extruder 11. Extruder 11 has a nozzle head including a centered guide (not shown) for conductor 10. Mechanism 18 the details of which are neither shown nor described enables a realignment of the two components if they should have been separated. This ensures that position and alignment of rod 12 are always the same when the rod enters tubular housing 13. Tubular housing 13 includes a guide (not shown) underlying the rod 12 at the downstream end of tubular casing 13 so that rod 12 in tubular casing 13 always extends in the same vertical plane. Finally a sagging measuring device (not shown) is associated with tubular casing 13 to control the sagging of rod 12 within the inclined tubular housing 13.

As indicated in FIG. 1 a pair of inspection glass fixtures 20, 22 are provided on tubular housing 13 at positions axially spaced and circumferentially spaced for 90°. The inspection glass fixtures 20, 22 schematically shown in FIG. 2 comprise tube sections connected to the interior of tubular housing 13 via corresponding bores. The structure of inspection glass fixtures 20, 22 will not be explained in detail since they may be of any known design. At their free ends they include inspection glasses 24 and 26, respectively, to allow inspection of the rod 12 within tubular housing 13 by means of optical sensor devices 28 and 30, respectively. Rod 12 is shown in FIG. 2 in cross section and comprises conductor 10 and sleeve 10a, the diameter and any eccentricities of which relative to conductor 10 are to be determined.

Optical sensor devices 28, 30 are e.g. cameras including so-called diode lines sensitive in particular of infrared light. Opposite to inspection glass fixtures 20 and 22, respectively, there are provided infrared light sources 32 and 34, respectively. A shadow resulting from sleeve 10a or rod 12 impinges upon sensor devices 28, 30. This allows to determine not only the diameter of rod 12 but also the position of said shadow relative to a desired position. As already mentioned conductor 10 may be precisely guided in the tubular housing and assumes a reproduceable position due to the precise positional relationship between extruder 11 and tubular housing 13 and due to the guide within tubular housing 13. Furthermore any sagging of conductor 10 is determined so that the position of conductor 10 is relatively precisely defined. Furthermore this position may be determined e.g. by the use of a conductor 10 without insulation or with a very thin insulation. This desired position may be stored in optical sensor devices 28, 30.

If the position of the shadow of rod 12 as determined in optical detector devices 28, 30 deviates from said desired position, this indicates that sleeve 10a is not concentric to conductor 10. An operator will then adjust the extruder tools so that any eccentricities are eliminated. In FIG. 2 the output signals of optical sensor devices 28, 30 are supplied to an indicating and/or measuring device 36.

Figure 2:
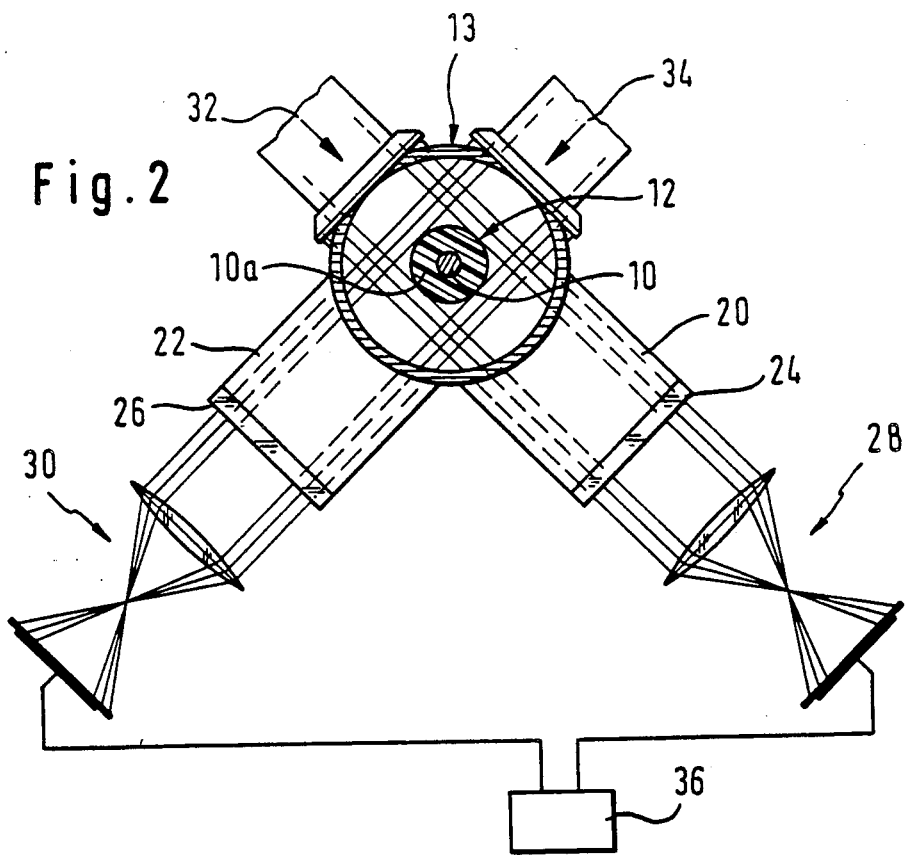
Figure 3:
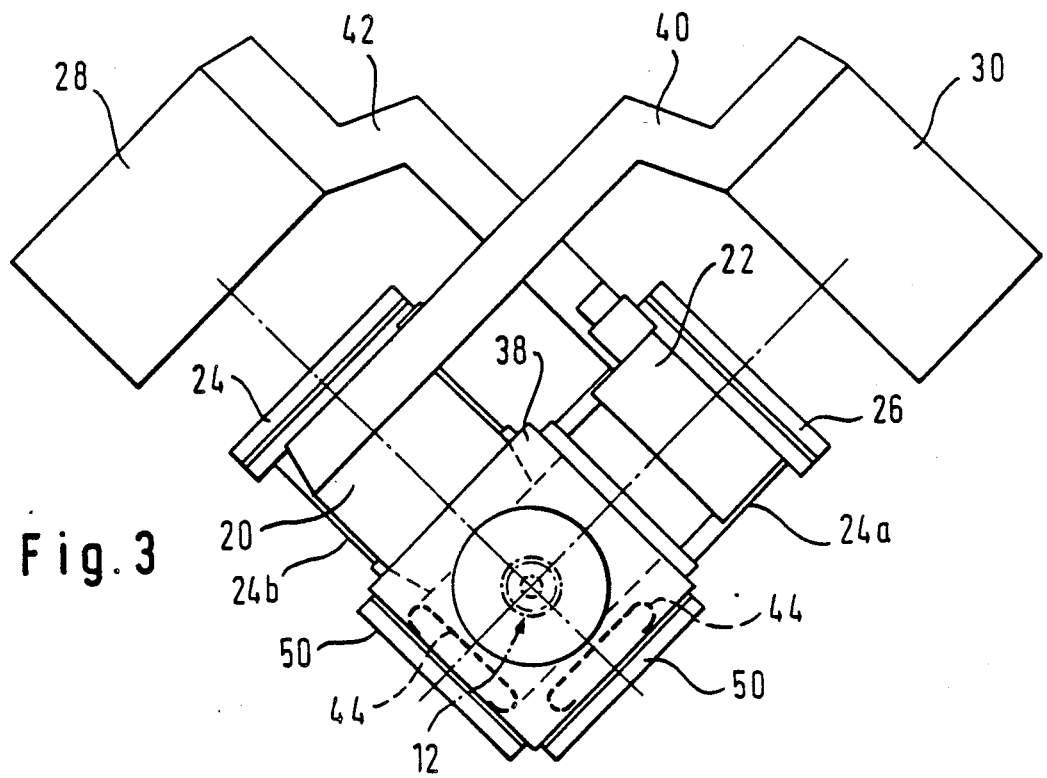
FIG. 3 shows a similar view as in FIG. 2 of an practiced embodiment including structural details.
Figure 4:
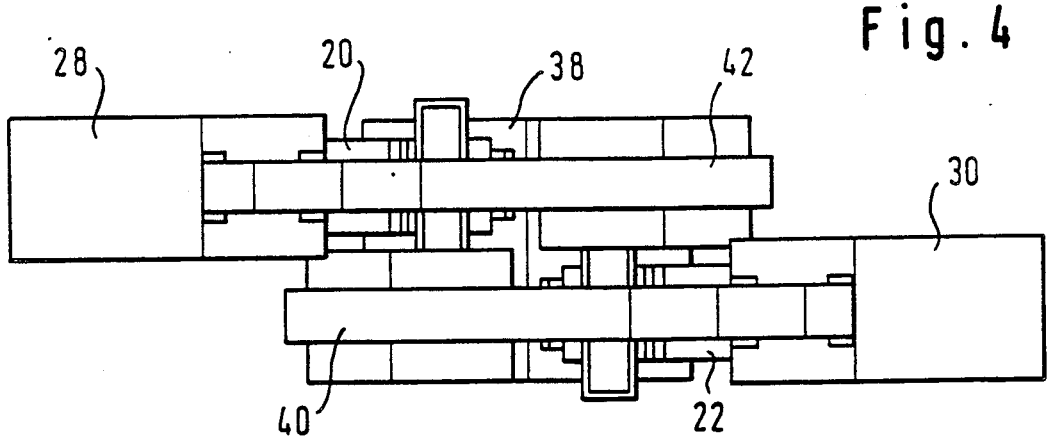
FIG. 4 shows an elevational view of the apparatus in FIG. 3.
Figure 5:
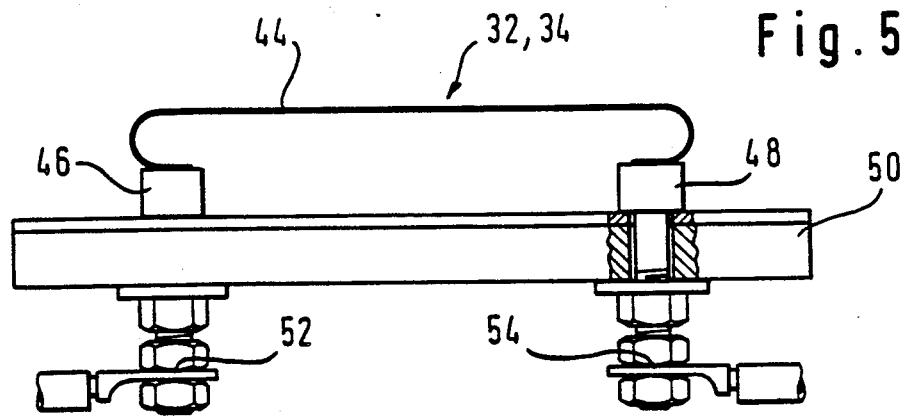
FIG. 5 shows a light source for the apparatus of the present invention.

FIG. 3 to 5 show the structural details of a practical embodiment of the apparatus shown in FIG. 2. For simplicity reasons the inspection glass fixtures and the optical sensor devices in FIG. 3 and 4 have been designated by the same reference numerals as in FIG. 2.

Tube sections 24a, 24b of inspection glass fixtures 20, 22 are mounted to a rectangular block 38 including matching bores in the area of tube sections 24a, 24b. Furthermore it includes an axial bore for the passage of rod 12 indicated by dash-dotted lines. The opposite end faces of block 38 are sealingly connected to sections of tubular housing 13 and housing portion 14, respectively. Z-shaped arms 40, 42 are mounted to housing 13 and carry at their free ends the optical sensor devices 28, 30 that are aligned to the axis of tube sections 24, 24b.

As shown in FIG. 5 light sources 32, 34 include incandescent strips 44 connected via contact sockets 46, 48 to a support member 50 carrying at the other end terminals 52, 54 for a power supply. The unit shown in FIG. 5 is also mounted to block 38, with incandescent strip 44 extending into the interior of block 38 through a corresponding opening. In FIG. 3 the incandescent strip is shown by dotted lines.

As may be readily appreciated the measuring apparatus shown in the figures is comprised of a structural unit adapted to be mounted in a tubular housing intermediate its ends and which may be subsequently inserted in already assembled systems.

I claim:

1. An apparatus for measuring eccentricities of a rod of plastic material extruded outwardly in a first axial direction from an outlet nozzle of an extruder, comprising:

optical sensing means for sensing any deviation of the outer periphery of an extruded rod from concentricity relative to a central axis of said sensing means;

support means for rigidly supporting said optical sensing means with the central axis of the sensing means in alignment with the outlet nozzle axis of an extruder from which said rod is extruded, said support means comprising a block having a first through bore for passage of an extruded rod through said bore in a first axial direction, and a mounting fixture for mounting the block with said first through bore aligned with said extruder outlet nozzle axis;

said optical sensing means comprising a first optical sensor device directed in a first direction towards the central axis of said sensing means, a second optical sensor device oriented at 90° to said first optical sensor device, a first light source positioned on the opposite side of said central axis to said first optical sensor device and directed towards said first optical sensor device for providing a shadow of the rod on said first optical sensor device, and a second light source positioned on the opposite side of said central axis to the second optical sensor device and directed towards said second optical sensor device for providing a shadow of said rod on said second optical sensor device; and output means connected to said first and second optical sensor devices for measuring the output from said sensor devices.

2. Apparatus as claimed in claim 1, wherein said support means comprises a pressure tube for vulcanizing a coating sleeve on said rod, said optical sensor device and light sources being rigidly supported on said tube, and fitting means for rigidly securing said pressure tube to said extruder outlet nozzle.

3. Apparatus as claimed in claim 1, wherein said first and second optical sensor device are spaced axially apart from one another along the central axis of said sensor means.

4. Apparatus as claimed in claim 1, wherein said block has a second through bore extending transversely through said first through bore, and a third through bore perpendicular to said second through bore extending transversely through said first through bore, said first optical sensor device and light source being mounted at opposite ends of said second through bore and said second optical sensor device and light source being mounted at opposite ends of said third through bore.

5. Apparatus as claimed in claim 4, wherein each optical sensor device includes an inspection glass fixture secured to one end of the respective through bore and an optical detector rigidly connected to said block in alignment with the respective inspection glass fixture.

6. Apparatus as claimed in claim 5, including a pair of mounting arms, each arm being secured to the block at one end and carrying a respective one of said optical detectors at the opposite end.

7. Apparatus as claimed in claim 6, wherein the arm of each of the optical detectors is secured to the inspection glass fixture of the other optical sensor device.

8. Apparatus as claimed in claim 1, wherein each light source comprises a support member having terminals for connection to a power supply and an incandescent strip mounted in said support member, said support means having recesses for mounting each support member and incandescent strip in said support means as a unit.

* * * * *

UNITED STATES PATENT AND TRADEMARK OFFICE
CERTIFICATE OF CORRECTION

PATENT NO. : 5,094,600
DATED : March 10, 1992
INVENTOR(S) : HARALD SIKORA It is certified that error appears in the above-identified patent and that said Letters Patent is hereby corrected as shown below:

Column 6, Line 1 "sensor device" should read --sensor devices--;

Column 6, Line 6 "sensor device" should read --sensor devices--.

Signed and Sealed this

Eighth Day of June, 1993

Attest:

MICHAEL K. KIRK

Attesting Officer

Acting Commissioner of Patents and Trademarks